Feb. 28, 1961 R. D. PARRY 2,973,125
FISHING ROD SUPPORT
Filed July 21, 1958

INVENTOR.
Robert D. Parry.
BY Wood, Herron & Evans.
ATTORNEYS.

United States Patent Office 2,973,125
Patented Feb. 28, 1961

2,973,125

FISHING ROD SUPPORT

Robert D. Parry, 1336 Custer Ave., Cincinnati, Ohio, assignor of one-fourth to Alfred Bloch, Cincinnati, Ohio Filed July 21, 1958, Ser. No. 750,031

3 Claims. (Cl. 224—5)

This invention relates to fishing equipment, and it is directed in particular to a support for a fishing rod which is designed to be worn about the neck of a fisherman to hold his rod and thereby free both of his hands when he desired to change lures, bait his hook, attend his line, reel, etc.

It may be appreciated that even as simple an operation as tieing a knot requies both hands and that under many fishing conditions it is either impossible or undesirable for a fisherman to rest his rod upon the ground to free both of his hands. For example, the fisherman may be wading a stream, which is often the case in fly fishing. Or, the fisherman may be casting from a sandy or muddy bank which would be damaging to his reel if it were to be laid upon the ground. Even in the case of trolling or casting from an open boat it is often undesirable to lay a fine rod and reel in the bottom of the boat, because such boats are frequently wet and often dirty.

Thus, one of the objectives of the invention has been to provide a fishing rod support which is adapted to hold a rod in an upright position in front of a fisherman so that the rod and line are in full view and readily accessible.

Another objective has been to provide a fishing rod support of the type set forth which is of simplified construction and adapted to be manufactured and sold at low cost.

Another objective of the invention has been to provide a rod support which is adapted to hold a great number of different types and sizes of fishing rods, that is, the rod support of this invention is equally well adapted to hold fly fishing rods, spinning rods or casting rods of different sizes.

Another objective of the invention has been to provide a rod support of the type set forth which is small and adapted to be folded or rolled up so as to occupy a minimum of space in a tackle box.

Another objective of the invention has been to provide a rod support which is impervious to weather conditions, being resistant to the sun, dampness, mold etc.

Another objective of the invention is to provide a rod support which is light in weight and designed to be worn about the neck of a fisherman in such a way that it is not in his way nor does it interfere with his casting motions.

Other objectives and features of the invention will be readily apparent to those skilled in the art from the following detailed description of the drawings in which.

Figure 1:
Figure 1 is a diagrammatic perspective view showing a rod support incorporating the principles of the present invention in place about the neck of a fisherman.
Figure 2:
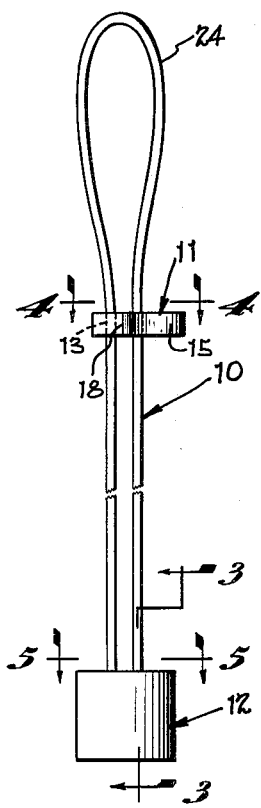
Figure 2 is a front elevational view of the rod support, the overall length being shortened for illustration purposes.
Figure 3:
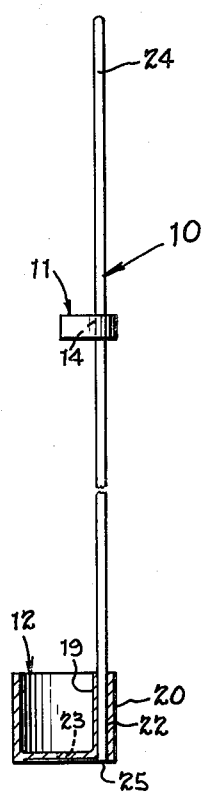
Figure 3 is a side view with the lower portion being shown in cross section, the section being taken on the line 3—3 in Figure 2.
Figure 4:
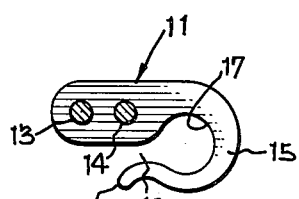
Figure 4 is a fragmentary cross sectional view taken on the line 4—4 of Figure 2.
Figure 5:
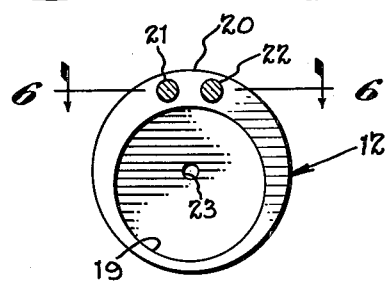
Figure 5 is a cross sectional view taken on the line 5—5 of Figure 2.

The rod support of this invention comprises only three elements, a lanyard 10, a slide 11 and a cup 12. In the preferred embodiment, the lanyard consists of a length of woven polyethylene line which is approximately 3/16 of an inch in diameter and 54 inches long. Both the slide 11 and the cup 12 are made of molded plastic material which preferably is polyethylene or an equivalent, inert, semi-flexible plastic. The slide includes a shank portion having two holes 13 and 14 through it which are of a diameter to receive the two runs of the lanyard in slip-fit relation. One end of the slide includes an integral hook portion 15 which, in the instance shown, has a throat 16 and an inner diameter 17 which are arranged to receive fishing rods as will be explained. Also, as may be seen from Figure 4, the outer end of the hook is turned back as at 18 to provide a flare to the throat to assist in the engagement of the hook with a fishing rod. The plastic material employed for the hook, being semi-flexible permits the throat 16 to open and close as rods are engaged and disengaged with the hook.

Figure 6:
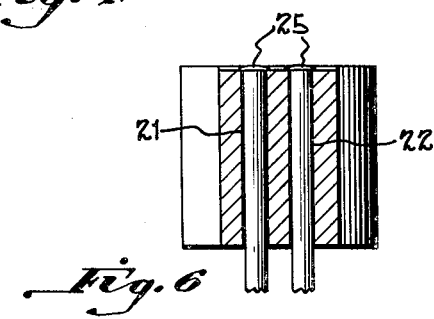
Figure 6 is a fragmentary cross sectional view taken on the line 6—6 of Figure 5.

The cup 12 is cylindrical and it has a cylindrical well 19 in it which is eccentric with respect to the outer wall of the cup to provide a substantially thick wall at the side 20 of the cup. Two holes 21 and 22, identical to the holes 13 and 14 extend vertically through the cup in the thickened wall area and these holes also receive the two runs of the lanyard. It is preferred that the bottom of the cup be pierced as shown at 23 to permit water to drain from it. As shown, the line forming the lanyard is doubled to provide a loop 24 to fit over the head of the fisherman, the two runs of the line then passing through the holes 13 and 14 in slide 11 and then through the two holes 21 and 22 in the cup. It is preferred that the lower ends of the runs of the lanyard be swaged and sealed to the bottom of the cup by means such as a heated tool as may be seen in Figure 6 at 25.

In use, the slide 11 is moved down upon the lanyard to provide a large loop 24 so that the lanyard may be placed over the fisherman's head and around his neck. The slide then may be run up to a comfortable position which holds the assembly in place on the fisherman. To engage a rod with the support, the butt of the pole is engaged in well 19 of the cup and then the rod, at some place above its handle portion, is engaged in the throat 16 of hook 15, being held therein by the semi-flexible nature of the plastic material employed. When thus engaged, the pole is at the front of the fisherman with the butt end near his waist and the pole extending up over one of his shoulders. This places the reel in full view of the fisherman and frees both of his hands so that he may attend the line.

Having described my invention I claim:

1. A fishing rod support comprising a cup to receive the butt of a fishing rod, a length of line which is doubled to provide a loop for engagement about the neck of a fisherman and two strands which depend side by side from the loop, the ends of said doubled line affixed to said cup, a slide engaged upon both of the strands of the doubled line between said loop and said cup in slip-fit relation to serve as a means for adjusting the size of the loop, and a hook integral with said slide and engageable with a fishing rod the butt of which is resting in said cup.

2. A fishing rod support as set forth in claim 1 in which the inside of the cup is eccentric with respect to the outside thereof, whereby the cup has a thickened wall portion at one side thereof, said thickened wall portion having two holes extending vertically therethrough, the lower endwise portions of said strands extending through said holes, and means at the lower ends of the strands locking said strands against upward withdrawal through the holes.

3. A fishing rod support as set forth in claim 1 in which the hook is semi-flexible to permit the throat thereof to be enlarged to permit insertion and withdrawal of a fishing rod.

References Cited in the file of this patent

UNITED STATES PATENTS

| | | |
|---|---|---|
| 710,776 | Hobart | Oct. 7, 1902 |
| 1,720,982 | Van Brunt | July 16, 1929 |

FOREIGN PATENTS

| | | |
|---|---|---|
| 10,333 | Great Britain | July 15, 1915 |